United States Patent [19]

Wegner et al.

[11] 4,284,544
[45] Aug. 18, 1981

[54] PROCESS FOR THE PREPARATION OF WATER-DISPERSIBLE OR WATER-SOLUBLE BLOCKED POLYISOCYANATES, THE BLOCKED POLYISOCYANATES OBTAINABLE BY THIS PROCESS AND LACQUER BINDERS CONTAINING THESE BLOCKED POLYISOCYANATES AS ISOCYANATE COMPONENT

[75] Inventors: Christian Wegner, Cologne; Kurt Findeisen, Odenthal; Franz Weider, Leverkusen, all of Fed. Rep. of Germany

[73] Assignee: Bayer Aktiengesellschaft, Bayerwerk, Fed. Rep. of Germany

[21] Appl. No.: 102,059

[22] Filed: Dec. 10, 1979

[30] Foreign Application Priority Data

Dec. 14, 1978 [DE] Fed. Rep. of Germany ....... 2853937

[51] Int. Cl.³ .............................................. C08L 75/06
[52] U.S. Cl. ................................ 260/29.2 TN; 528/45
[58] Field of Search ................... 260/29.2 TN; 528/45

[56] References Cited

U.S. PATENT DOCUMENTS

| | | | |
|---|---|---|---|
| 4,028,313 | 6/1977 | Müller et al. | 260/29.2 TN |
| 4,098,933 | 7/1978 | Burkhardt et al. | 427/379 |
| 4,184,990 | 1/1980 | Reischl et al. | 260/29.2 TN |

FOREIGN PATENT DOCUMENTS

| | | | |
|---|---|---|---|
| 2645779 | 4/1978 | Fed. Rep. of Germany | 260/29.2 TN |
| 2708611 | 5/1978 | Fed. Rep. of Germany | 260/29.2 TN |

*Primary Examiner*—Ronald H. Smith
*Assistant Examiner*—Thurman K. Page
*Attorney, Agent, or Firm*—Gene Harsh; Lawrence S. Pope; Thomas W. Roy

[57] ABSTRACT

Blocked polyisocyanates with improved water-dispersible or water-soluble properties are prepared by reacting polyisocyanates, in which 50 to 99.8% of the isocyanate groups are blocked, optionally in a solvent-free environment with an organic polyaminosulphonate or an organic polyaminosulphonic acid in sufficient quantities to provide an end product containing from 0.1 to 10%, by weight, of sulphonate groups ($SO_3^-$). The blocked polyisocyanates have particular utility when used in combination with hydrophobic polyhydroxyl compounds as binders in aqueous coating compounds.

8 Claims, No Drawings

PROCESS FOR THE PREPARATION OF WATER-DISPERSIBLE OR WATER-SOLUBLE BLOCKED POLYISOCYANATES, THE BLOCKED POLYISOCYANATES OBTAINABLE BY THIS PROCESS AND LACQUER BINDERS CONTAINING THESE BLOCKED POLYISOCYANATES AS ISOCYANATE COMPONENT

BACKGROUND OF THE INVENTION

1. Field of the Invention

This invention relates to polyisocyanates, and more particularly to blocked polyisocyanates having improved dispersibility or solubility in water.

2. Description of the Prior Art

The preparation of water-dispersible or water-soluble blocked polyisocyanates is known (see e.g. German Offenlegungsschriften Nos. 2,456,469 (corresponding to U.S. Pat. No. 4,098,933) and 2,708,611). The compounds mentioned in these publications may be used in aqueous solution or dispersion, inter alia in combination with water-dispersible or water-soluble polyhydroxyl compounds as binders for polyurethane lacquers which are applied from the aqueous phase. If, however, the polyhydroxyl compounds used are not normally soluble in water, the two components must first be modified in separate reaction mixtures to render them hydrophilic and then emulsified in water with the aid of organic cosolvents, and the two reaction mixtures are then mixed together. In the processes described in the aforesaid prior publications, moreover, a solvent-free preparation of water-dispersible or water-soluble blocked polyisocyanate is possible only with the addition of large quantities of ionic starting components or large proportions of polyethers containing ethylene oxide units as hydrophilic reaction components. This has a disadvantageous effect on the resistance to water and stability to light of the surface structures finally obtained.

It was, therefore, an object of the present invention to provide a simple, i.e. in particular a solvent-free, process for the preparation of water-dispersible or water-soluble blocked polyisocyanates which could also be used in combination with hydrophobic polyhydroxyl compounds as binders in aqueous coating compounds.

It was surprisingly found that this object could be achieved by using diaminosulphonates as hydrophilic components for the blocked polyisocyanates.

SUMMARY OF THE INVENTION

The present invention relates to a process for the preparation of blocked polyisocyanates which are soluble or dispersible in water by the reaction of a partially blocked organic polyisocyanate which is neither soluble nor dispersible in water and in which from 50 to 99.8% of the isocyanate groups are blocked with a blocking agent for isocyanate groups, with a compound which has at least one isocyanate-reactive group and at least one hydrophilic group which renders the reactive product dispersible or soluble in water or at least one group capable of being converted into such a hydrophilic group, in which latter case the group is converted into a hydrophilic group after the isocyanate addition reaction, characterized in that the compound which has at least one isocyanate-reactive group and at least one hydrophilic group or at least one group capable of conversion into a hydrophilic group is an organic polyaminosulphonate or organic polyaminosulphonic acid and the quantity of this hydrophilic modifying component and/or the degree of neutralization of the free sulphonic acid groups initially present in calculated so that the end products of the process contain from 0.1 to 10%, by weight, of sulphonate groups ($SO_3^-$).

The present invention also relates to the water-dispersible or water-soluble blocked polyisocyanates obtainable by this process, optionally in the form of dispersions or solutions in water.

Furthermore, the present invention relates to binders for coating compounds which are to be applied from the aqueous phase, which binders contain a polyisocyanate component and a polyhydroxyl component and are optionally dispersed in water or partly dispersed and partly dissolved, in water, characterized in that:

(1) the polyisocyanate component consists of a water-dispersible or water-soluble polyisocyanate obtainable by the process according to the present invention; and (2) the polyhydroxyl compound consists of a polyester polyol which is neither dispersible nor soluble in water and/or a polyhydroxy polyacrylate which is neither dispersible nor soluble in water;

the above-mentioned components being present in such proportions that from 0.5 to 2 equivalents of hydroxyl groups are available per equivalent of blocked isocyanate groups.

DETAILED DESCRIPTION OF THE INVENTION

All organic polyisocyanates are suitable for the process according to the present invention, but it is preferred to use from di- to tetra-functional polyisocyanates having molecular weights below 800 containing aliphatically and/or cycloaliphatically bound isocyanate groups. Tris-(isocyanatohexyl)biuret is particularly preferred, optionally as a mixture with its higher homologues, of the type obtainable, for example, according to the teaching of German Offenlegungsschrift No. 2,308,015. Also particularly suitable for the process according to the present invention are 1-isocyanato-3,3,5-trimethyl-5-isocyanatomethylcyclohexane, reaction products thereof with sub-equivalent quantities of low molecular weight polyols, trimers thereof obtained by isocyanurate formation and dimers thereof having uretdione structures.

The corresponding reaction products of hexamethylene diisocyanate with sub-equivalent quantities of low molecular weight polyols, in particular trimethylolpropane, are also particularly suitable for the process according to the present invention. Such polyisocyanates containing urethane groups are generally obtained by removing the low molecular weight polyol with a large excess of the diisocyanate, for example by distillation. Also particularly suitable for the process according to the present invention are bis-(6-isocyanatohexyl)-uretdione and polyisocyanates containing isocyanurate groups, the latter being obtainable by the trimerization of hexamethylene diisocyanate, optionally in admixture with 2,4-diisocyanatotoluene.

Apart from these preferred polyisocyanates, any other aliphatic, cycloaliphatic, araliphatic, aromatic or heterocyclic polyisocyanates may be used for the process according to the present invention, e.g. those described by W. Siefken in Liebigs Annalen der Chemie 562, pages 75 to 136, such as the following: ethylene diisocyanate, 1,4-tetramethylene diisocyanate, 1,6-hexamethylene diisocyanate, 1,2-dodecane diisocyanate, cyclobutane-1,3-diisocyanate, cyclohexane-1,3- and -1,4-diisocyanate and mixtures of these isomers, 1-isocyanato-2-isocyanatomethyl-cyclopentane, 1-isocyanato-3,3,5-trimethyl-5-isocyanatomethylcyclohexane, 2,4- and 2,6-hexahydrotolylene diisocyanate and mixtures of these isomers, hexahydro-1,3- and/or -1,4-phenylene diisocyanate, perhydro-2,4'- and/or 4,4'-diphenylmethane diisocyanate, 1,3- and 1,4-phenylene diisocyanate, 2,4- and 2,6-tolylene diisocyanate and mixtures of these isomers, diphenylmethane-2,4'- and/or 4,4'-diisocyanate, naphthalene-1,5-diisocyanate, triphenylmethane-4,4',4''-triisocyanate, polyphenyl-polymethylene polyisocyanates which may be obtained by aniline/formaldehyde condensation, followed by phosgenation, and mixtures of the above-mentioned polyisocyanates.

The polyisocyanates exemplified above are used partly in the blocked form in the process according to the present invention. Suitable blocking agents include in particular compounds which preferably have one isocyanate-reactive group and enter into an addition reaction with organic isocyanates at temperatures above 50° C., preferably at temperatures of from 60° to 100° C., and whose addition products thereby obtained react at temperatures of from 100° to 200° C. with non-volatile polyols containing primary hydroxyl groups to release the blocking agent and form urethanes. Suitable blocking agents of this type include, e.g. secondary and tertiary alcohols, such as isopropanol and tertiary butanol, C—H-acidic compounds, such as dialkylmalonates, acetyl acetone, alkyl esters of acetoacetic acid, oximes, such as formaldoxime, acetaldoxime, methyl ethyl ketone oxime, cyclohexanone oxime, acetophenone oxime, benzophenone oxime or diethyl glyoxime, lactams, such as ε-caprolactam, δ-valerolactam or γ-butyrolactam, phenols, such as phenol or o-methylphenol, N-alkylamides, such as N-methylacetamide, imides, such as phthalimide, imidazole, triazole or alkali metal bisulphites. The compounds preferably used in the process according to the present invention are ε-caprolactam and C—H-acidic compounds, in particular compounds containing activated methylene groups, e.g. malonic acid dialkyl esters containing $C_1$–$C_4$ alkyl groups, in particular malonic acid diethyl ester, acetoacetic acid alkyl esters containing a $C_1$–$C_4$ alkyl group, in particular ethyl acetoacetate, or acetyl acetone.

To prepare the partially blocked polyisocyanates which are to be used in the process according to the present invention, the unblocked polyisocyanates exemplified above are reacted at temperatures above 50° C., preferably from 60° to 100° C., preferably with a quantity of at least one of the blocking agents exemplified above corresponding to an equivalent ratio of isocyanate groups to isocyanate-reactive groups of from 1:0.5 to 1:0.99, preferably from 1:0.75 to 1:0.5. When blocking agents containing active methylene groups are used, it is advantageous to use basic catalysts, such as diazabicyclooctane, triethylamine, alkali metal alcoholates or alkali metal phenolates, such as sodium ethylate or sodium phenolate. When blocking agents containing OH or NH groups are used, it may be advantageous to catalyze the blocking reaction by using a metal salt, such as dibutyl tin dilaurate or tin octoate.

The partially blocked polyisocyanates obtained in this way may be used in this form as starting materials for the process according to the present invention or they may first be modified using sub-equivalent quantities of preferably difunctional hydroxyl compounds, e.g. simple glycols, such as hexamethylene glycol, simple polyester diols having a molecular weight of below 800 prepared, for example, by the reaction of adipic acid or phthalic acid with excess quantities of alkane diols, such as ethylene glycol, tetramethylene glycol or hexamethylene glycol, or simple polyether glycols having molecular weights of below 800, e.g. the corresponding polyethylene glycols or polypropylene glycols, so that the partially blocked polyisocyanate finally used in the process according to the present invention is a partially blocked isocyanate prepolymer. It is, of course, possible first to react the unblocked polyisocyanate with a corresponding quantity of hydroxyl compound to form an isocyanate prepolymer and then partially to block the remaining isocyanate groups in the manner described above. This additional modification of the first-mentioned, simple partially blocked polyisocyanates is, however, generally not necessary. The partially blocked polyisocyanates to be used in the process according to the present invention generally contain from 0.5 to 10%, by weight, preferably from 1 to 5%, by weight, of free isocyanate groups and from 1.2 to 24.5%, by weight, preferably from 6 to 14%, by weight, of blocked isocyanate groups (calculated as NCO), and the molar ratio of NCO (free) to NCO (blocked) is always from 1:1 to 1:49. The polyaminosulphonic acids or sulphonates used for hydrophilic modification of the partially blocked polyisocyanates may be aliphatic, aromatic or araliphatic. It is preferred to use diaminosulphonates or sulphonic acids having 1 or 2 sulphonate or sulphonic acid groups. The amino groups may be primary or secondary. Triaminosulphonic acids may be used as part or all of the polyaminosulphonic acid component, particularly when using polyisocyanates which are difunctional in the unblocked form, but it is not preferred. The polyaminosulphonates or sulphonic acids generally have a molecular weight of below 500. The following are typical examples: 2-(2-aminoethylamino)-ethane sulphonic acid; 2,4-diaminobenzene sulphonic acid; 2,5-diaminobenzene sulphonic acid; 5-amino-2-(phenylamino)-benzene sulphonic acid; 5-amino-2-[(4-aminophenyl)-amino]-benzene sulphonic acid; 5-amino-2-[(methylamino)-methyl]-benzene sulphonic acid; 2,4-diamino-5-methylbenzene sulphonic acid; 5,6-diamino-1-naphthalene sulphonic acid; 4,6-diamino-1,3-benzene disulphonic acid; 5,6-diamino-1,3-naphthalene disulphonic acid; benzidine-2,2'-disulphonic acid; 4,4-diaminostilbene-2,2'-diaminosulphonic acid and salts of these compounds. The nature of the cation is of completely minor importance and the salts are generally sodium, potassium or ammonium salts. The ammonium cation may be derived either from ammonia or, in particular, from tertiary amines, such as triethylamine. It is preferable to use salts (sulphonates) in the reaction according to the present invention although the partially blocked polyisocyanates could in principle also be reacted with the free aminosulphonic acids and the sulphonic acid groups could subsequently be converted into sulphonate groups by simple neutralization.

To carry out the process according to the present invention, the partially blocked polyisocyanate is preferably reacted at from 20° to 120° C., in particular at from 40° to 90° C., with a concentrated aqueous solution of the diaminosulphonate, while an NCO/NH equivalent ratio of from 1:0.8 to 1:1.2 is maintained. The free amino groups react with the as yet unreacted isocyanate groups and an opaque water-in-oil emulsion is formed. The reaction mixture is finally further diluted with water while cooled to room temperature. This addition of water may be carried out continuously or portionwise or directly after addition of the ionic component, which is preferable if the viscosity of the mixture rises too high. The hydrophilic component may also be added in the whole quantity of water required for preparing the emulsion.

Although it is a particular advantage of the procedure described above that the use of an organic auxiliary solvent may be completely dispensed with, any type of organic solvent may, of course, be added in the course of the process and, if desired, subsequently removed by distillation. The use of a solvent, particularly one which is miscible with water, is particularly advantageous if a solids content above 50% is desired.

Thus, for example, after addition of the concentrated aqueous solution of the diaminosulphonic acid salt, the reaction mixture may be diluted with a comparatively small quantity of isopropanol instead of with water. A clear solution of a blocked isocyanate having a solids content of up to 80% is thereby obtained. This may be mixed with organic solvent or further diluted with any desired quantity of water to form a stable emulsion. Further dilution with water or organic solvent may, of course, be completely dispensed with after the addition of the aqueous concentrated solution of sulphonic acid salts.

If the salt of the diaminosulphonic acid is one which may be used directly or is soluble in an organic, water-miscible solvent, it is possible to obtain solutions having high solid contents which are completely anhydrous and capable of being diluted with water.

The process according to the present invention may also be modified by the additional use of hydrophilic polyether alcohols. In that case, polyether alcohols, preferably containing hydrophilic ethylene oxide units, are chemically fixed in the partially blocked polyisocyanates used as starting material. The term "partially blocked polyisocyanates" as used in the present invention, therefore, also includes compounds containing free isocyanate groups and blocked isocyanate groups in the quantities indicated above and additional hydrophilic polyether segments.

Suitable hydrophilic polyether alcohols include in particular those in the molecular weight range of from 500 to 12,000 which are obtained in known manner by the alkoxylation of monofunctional starter molecules, e.g. monohydric alcohols, such as methanol, ethanol, propanol or butanol, and in which the polyalkylene oxide chain is built up to an extent of from 50 to 100% from ethylene oxide units and which apart from the ethylene oxide units preferably contain only propylene oxide units. The corresponding pure polyethylene oxides having one hydroxyl end group are particularly preferred.

The addition modification of the partially blocked polyisocyanates used as starting materials with these hydrophilic polyether alcohols may be carried out before, during or after the blocking reaction. The reaction is generally carried out within the temperature ranges mentioned above for the blocking reaction. The hydrophilic polyether alcohols are used, if at all, in quantities such that the starting materials contain from 0.1 to 20%, by weight, preferably not more than 10%, by weight, of ethylene oxide units ($CH_2$—$CH_2$—O) built into the polyether chain in addition to the free and blocked isocyanate groups mentioned above in the concentrations given.

The further modification with polyaminosulphonic acid or sulphonates, which is an essential characteristic of the present invention, is then carried out in the manner described above and water-dispersible or water-soluble products according to the present invention are in all cases obtained in the aqueous phase and the dispersions or solutions may be further diluted with water in any amounts. The end products according to the present invention generally contain from 1 to 20%, by weight, preferably from 5 to 12%, by weight, of blocked isocyanate groups (calculated as NCO), from 0.1 to 10%, by weight, preferably from 0.5 to 5%, by weight, of sulphonate groups ($SO_3^-$) and from 0 to 20%, by weight, preferably from 0 to 10%, by weight, of ethylene oxide units ($CH_2$—$CH_2$—O) built into a polyether chain.

The products obtained by the process according to the present invention have the remarkable property of not only being dispersible or soluble on their own without the aid of dispersing agents or solvents, but of also acting as emulsifiers for polyester polyols and polyhydroxy polyacrylates which are normally hydrophobic, such as those commonly used as polyhydroxyl components in polyurethane lacquers. The possibility which this opens up of using hydrophobic polyhydroxyl compounds in the preparation of lacquers which are applied from the aqueous phase and crosslinked by heat provides a very important improvement in the water resistance of the films and coatings finally obtained compared with those obtained from the aqueous systems known in the art, in which it is necessary to use water-dispersible or water-soluble polyhydroxyl compounds.

The polyhydroxyl compounds are generally liquids or solids which melt at moderately elevated temperatures (up to ca. 80° C). They generally have a hydroxyl content of from 0.5 to 20%, by weight, preferably from 2 to 15%, by weight.

The required polyester polyols are prepared in known manner by the reaction of polycarboxylic acids or polycarboxylic acid anhydrides, such as adipic acid, phthalic acid, tetrahydrophthalic acid and/or hexahydrophthalic acid or the anhydrides thereof, with excess quantities of simple alcohols, such as ethylene glycol, 1,2-propane diol, trimethylene glycol, 1,2-butane diol, 2,3-butane diol, tetramethylene glycol, hexamethylene glycol, trimethylol-propane and/or glycerol.

Preparation of the polyhydroxy polyacrylates is carried out in known manner by the copolymerization of olefinically unsaturated monomers, such as styrene, acrylonitrile, methyl acrylate, ethyl acrylate, methyl methacrylate, ethyl methacrylate, butyl acrylate and/or butyl methacrylate, with olefinically unsaturated monomers which have active hydrogen atoms, e.g. acrylic acid, methacrylic acid and, in particular, hydroxyalkyl acrylates and methacrylates, such as 2-hydroxyethyl acrylate, 2-hydroxyethyl methacrylate, 3-hydroxypropyl acrylate and/or 3-hydroxypropyl methacrylate.

The polyesterols exemplified above are preferred to the polyhydroxy polyacrylates.

To prepare the binders according to the present invention, the polyhydroxyl component, which is either liquid at room temperature or has been melted by heating to not more than 80° C., is mixed with the aqueous dispersion or solution of the blocked polyisocyanate with stirring, the two components being used in such proportions that from 0.5 to 2, preferably from 0.8 to 1.2, equivalents of hydroxyl groups are present per equivalent of blocked isocyanate groups.

In this way, the binders according to the present invention are obtained in the form of aqueous dispersions or in the form of partly dissolved, partly dispersed aqueous systems. In principle, however, it is also possible to mix the masked polyisocyanates with the polyhydroxyl component in the given proportions without water, either in the presence of organic solvents or solvent-free, in order to obtain binders which may be diluted with water.

The binders according to the present invention in the aqueous phase may be used, in particular, for the preparation of lacquers which are to be applied from the aqueous phase, which lacquers generally have a binder content of from 25 to 70%, by weight. In addition to the binders according to the present invention, these aqueous lacquers may contain the conventional auxiliaries and additives of lacquer technology. These include, for example, aminoplast and phenoplast precondensates which may be useful for absorbing the blocking agent which has been released, the precondensates being thereby converted into higher molecular components which do not interfere with the construction of the film and do not soften it. Suitable precondensates for this purpose include, for example, dimethylol urea, trimethylol melamine, hexamethylol melamine, etherified methylated melamines and bis-alkoxymethyl-urea. Other additives which may be used include the conventional inorganic fillers and pigments, catalysts for the crosslinking reaction and other auxiliaries.

The acqueous lacquers containing the binders according to the present invention may be applied to any substrates by any of the methods used in lacquer technology. Crosslinking necessitates heating of the coating so that the water first evaporates and the crosslinking reaction then takes place. Hardening of the lacquer layers generally takes place at temperatures of from 80° to 180° C., preferably from 100° to 150° C. Tough, solvent-resistant and water-resistant films are obtained in this way.

The following Examples illustrate the present invention in more detail without limiting it. The percentages given are percentages, by weight, unless otherwise indicated, and are based on the solids content of the products of the process.

EXAMPLES

EXAMPLE 1

A solution of 2.5 g of sodium phenolate in 500 g of biuretized hexamethylene diisocyanate (24% NCO) is reacted with 390 g of diethyl malonate for 3 hours at 90° C. 268 g of an 11.7% aqueous solution of the sodium salt of 2-(2-aminoethylamino)-ethane sulphonic acid are then added at 60° C. After 2 hours, the reaction mixture is diluted with 700 ml of water to form a milky emulsion.

Solids content: 50%
NCO (blocked): 11%
$SO_3^-$: 1.4%

EXAMPLE 2

251 g of ε-caprolactam are added portionwise to 500 g of a biuretized hexamethylene diisocyanate (23.8% NCO) at 100° C. The mixture is stirred for 3 hours and cooled to 60° C. and a solution of 57 g of sodium-2,4-diaminobenzene sulphonate in water preheated to 60° C. is added at a high stirring speed. Stirring is continued for 2 hours at 60° C. and during this time the reaction mixture is diluted with 100 ml of water. The heating is terminated and a further 800 ml of water are added and the mixture is stirred until a highly fluid milky opaque emulsion is obtained.

Solids content: 43.5%
NCO (mask): 11.6%
$SO_3^-$: 2.7%

EXAMPLE 3

2.7 g of sodium phenolate are mixed with 370 g of diethyl malonate with stirring at room temperature for 15 minutes. 500 g of a biuretized hexamethylene diisocyanate (23.8% NCO) are added and the reaction mixture is stirred for 3 hours at 90° C. after the exothermic reaction has died down. 40 g of an ethylene oxide polyether (molecular weight 2,000) which has been started on n-butanol and 1 ml of tin (II) octoate are then added and stirring is continued for a further 3 hours at 90° C. The speed of the stirrer is then increased and a solution of 46 g of sodium-2,4-diaminobenzene sulphonate in 150 ml of water is added and the mixture is stirred for 2 hours at 60° C.

The mixture is diluted with 800 ml of water and stirred until a milky opaque emulsion is obtained.

Solids content: 50%
NCO (blocked): 10.2%
$SO_3^-$: 1.8%
$CH_2-CH_2-O$: 4.2%

EXAMPLE 4

336 g of hexamethylene diisocyanate are added to a solution of 3.5 g of sodium phenolate in 258 g of diethyl malonate. After 3 hours' reaction at 90° C., 40 g of an ethylene oxide polyether (molecular weight 2,000) which has been started on n-butanol and 0.5 ml of tin (II) octoate are added and the reaction mixture is stirred for 3 hours at 80° C. 90 g of butane-1,3-diol are then added dropwise and the mixture is left to react for 2 hours at 80° C. The mixture is then cooled to 60° C. and reacted with 90 g of a 46% solution of the sodium salt of 2-(2-aminoethylamino)-ethane sulphonic acid for 2 hours at 60° C. The reaction mixture is then diluted with 650 ml of water to produce a milky opaque emulsion.

Solids content: 52%
NCO (Blocked): 8.8%
$SO_3^-$: 2.3%
$CH_2-CH_2-O$: 5.5%

EXAMPLE 5

67.5 g of butane-1,3-diol are added dropwise to 333 g of isophorone diisocyanate at 120° C. The mixture is stirred for 2 hours and cooled to 90° C. 187 g of diethyl malonate in which 3 g of sodium phenolate have previously been dissolved are then added. Stirring is continued for 3 hours at 90° C. A solution of 42 g of the sodium salt of 2-(2-aminoethylamino)-ethane sulphonic acid in 350 ml of isopropanol is then added with cooling to 70° C. The mixture is then stirred for 2 hours and a cloudy yellowish solution of a blocked polyisocyanate which may be diluted with water is finally obtained.

Solids content: 70%
NCO (blocked): 7.7%
SO$_3^-$: 4.0%

EXAMPLE 6

A solution of 2.5 g of sodium phenolate in 390 g of diethyl malonate is reacted with 500 g of biuretized hexamethylene diisocyanate (NCO=23.8%) for 3 hours at 90° C. A solution of 31.3 g of the sodium salt of 2-(2-aminoethylamino)-ethane sulphonic acid in 200 g of isopropanol is added at 60° C. After a reaction time of 2 hours, a pale yellow solution of a blocked polyisocyanate which may be diluted with water is obtained.

Solids content: 82%
NCO (blocked): 11.1%
SO$_3^-$: 1.4%

EXAMPLE 7

131 g of diethyl malonate, 1.2 g of sodium phenolate and 250 g of a biuretized hexamethylene diisocyanate are reacted as described in Example 1. 30 g of an ethylene oxide polyether (molecular weight 2,000) which has been started on n-butanol are then added and the mixture is stirred for 5 hours at 90° C. 190 g of a polyester (OH number 56, acid number max. 2, viscosity/75° C. from 2600 to 3400 cP) which has been prepared from hexane diol(1,6) and phthalic acid anhydride by known methods are then added. After 2 hours' stirring at 85° C., the reaction mixture is left to react for 2 hours at 60° C. with 34.5 g of sodium-2,4-diaminobenzene sulphonate dissolved in 250 ml of water. Because of the sharp rise in viscosity, the reaction mixture is diluted with 100 ml of water after 20 minutes. At the end of the two hours, 550 ml of water are added and stirring is continued for one hour at 60° C. 115 g of a polyester (OH number 395, acid number 11–15, viscosity/75° C. 1200 cP) which has been prepared from phthalic acid anhydride, ethylene glycol and trimethylol propane are then introduced into the resulting emulsion. The heating is terminated and the reaction mixture is stirred until a milky opaque emulsion is obtained.

Solids content: 46%
NCO (blocked, based on polyisocyanate component): 5.4%
SO$_3^-$ (based on polyisocyanate component): 2%
CH$_2$—CH$_2$—O (based on polyisocyanate component): 4.7%
NCO (blocked, based on polyisocyanate component): 1.01%

EXAMPLE 8

A solution of 2.5 g of sodium phenolate in 370 g of diethyl malonate is reacted with 500 g of a biuretized hexamethylene diisocyanate (NCO=23.8%) for 3 hours at 90° C. 80 g of an ethylene oxide polyether (molecular weight 2,000) which has been started on nbutanol and 1 ml of tin (II) octoate are then added. The reaction mixture is cooled to 60° C. after 3 hours and left to react with 90 g of a 46% aqueous solution of the sodium salt of 2-(2-aminoethylamino)-ethane sulphonic acid for 2 hours. After dilution with 200 ml of water, 480 g of a molten polyester (OH number 250–270, acid number max. 3, melting point 90°-100° C.) prepared by known methods from phthalic acid anhydride, maleic acid anhydride, hexahydrophthalic acid anhydride and trimethylol propane are added and at the same time water is added from time to time, the total amount being 2200 ml, so that a milky emulsion is finally obtained.

Solids content: 38%
NCO (blocked, based on polyisocyanate component): 9.7%
SO$_3^-$ (based on polyisocyanate component): 1.7%
CH$_2$—CH$_2$—O (based on polyisocyanate component): 8.0%
NCO (blocked, based on polyisocyanate component)/OH: 0.96%

EXAMPLE 9

1.25 g of sodium phenolate, 185 g of diethyl malonate, 250 g of biuretized hexamethylene diisocyanate (NCO=23.8%), 40 g of polyether and 0.5 g of tin (II) octoate are reacted together as in Example 13. The mixture is then reacted for 2 hours at 60° C. with 20.7 g of the sodium salt of 2-(2-aminoethylamino)-ethane sulphonic acid dissolved in 250 g of isopropanol. 245 g of the polyester described in Example 13 are then added. The mixture is stirred until a homogeneous solution is obtained and it is finally diluted with a further 150 g of isopropanol to form a pale yellow, slightly cloudy solution which may be diluted with water.

Solids content: 65%
NCO (blocked, based on polyisocyanate component): 9.7%
SO$_3^-$ (based on polyisocyanate component): 1.7%
CH$_2$—CH$_2$—O (based on polyisocyanate component)/OH: 1.0%

EXAMPLE 10 (Example of Practical Application)

The one-component emulsion prepared according to Example 8 is applied as a thin layer to a degreased aluminum sheet and stoved for 30 minutes at 130° C. A clear, elastic solvent-resistant and water-resistant film is obtained.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A binder for coating compounds which is to be applied from the aqueous phase, which binder contains a polyisocyanate component and a polyhydroxyl component and is optionally dispersed in water or partly dispersed and partly dissolved, characterized in that:
   (1) the polyisocyanate component consists of a water-dispersible or water-soluble blocked polyisocyanate obtainable by a process comprising reacting a polyisocyanate which is neither soluble nor dispersible in water with
      (a) a blocking agent, such that 50 to 99.8% of the isocyanate groups are blocked, and either
      (b) organic polyaminosulfonates in an amount sufficient to render the polyisocyanate dispersible or soluble, or
      (c) organic polyaminosulfonic acids and subsequently neutralizing sufficient acid groups to render the polyisocyanate dispersible or soluble; and
   (2) the polyhydroxyl component consists of a polyester polyol which is neither dispersible nor soluble in water and/or a polyhydroxy polyacrylate which is neither dispersible nor soluble in water;

the above-mentioned components being present in such proportions that from 0.5 to 2 equivalents of hydroxyl groups are available per equivalent of blocked isocyanate groups.

2. The binder according to claim 1, wherein said polyisocyanate component is di-, tri- or tetra-functional, has a molecular weight below 800 and contains aliphatically and/or cycloaliphatically bound isocyanate groups.

3. The binder according to claim 2, wherein said polyisocyanate component is tris-(isocyanatohexyl)biuret.

4. The binder according to claim 1, wherein said polyisocyanate component is 1-isocyanato-3,3,5-trimethyl-5-isocyanatomethylcyclohexane.

5. The binder according to claim 1, wherein said organic polyaminosulphonate is a salt of 2-(2-aminoethylamino)-ethane sulfonic acid.

6. The binder according to claim 1, wherein said organic polyaminosulphonate is a salt of 2,4-diaminobenzene sulfonic acid.

7. The binder of claim 1, wherein the ratio of hydroxyl group equivalents to blocked isocyanate group equivalents is from 0.8 to 1.2.

8. A binder for coating compounds which is to be applied from the aqueous phase, which binder comprises a polyisocyanate component and a polyhydroxyl component, is free from dispersing agents and solvents and is either dispersed in water or partly dispersed and partly dissolved, characterized in that:

(1) the polyisocyanate component consists of a water-dispersible or water-soluble blocked polyisocyanate obtainable by a process comprising reacting a polyisocyanate which is neither soluble nor dispersible in water with (a) a blocking agent, such that 50 to 99.8% of the isocyanate groups are blocked, and either (b) organic polyaminosulfonates in an amount sufficient to render the polyisocyanate dispersible or soluble, or (c) organic polyaminosulfonic acids and subsequently neutralizing sufficient acid groups to render the polyisocyanate dispersible or soluble; and (2) the polyhydroxyl component consists of a polyester polyol which is neither dispersible nor soluble in water and/or a polyhydroxy polyacrylate which is neither dispersible nor soluble in water;

the above-mentioned components being present in such proportions that from 0.5 to 2 equivalents of hydroxyl groups are available per equivalent of blocked isocyanate groups.

* * * * *